(12) United States Patent
Hernandez et al.

(10) Patent No.: US 7,886,139 B2
(45) Date of Patent: Feb. 8, 2011

(54) METHOD TO ENABLE FIRMWARE TO BOOT A SYSTEM FROM AN ISCSI DEVICE

(75) Inventors: Carol B. Hernandez, Austin, TX (US); Stephen D. Linam, Austin, TX (US); John T. O'Quin, II, Austin, TX (US); Mark W. Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 11/678,116

(22) Filed: Feb. 23, 2007

(65) Prior Publication Data

US 2008/0209196 A1 Aug. 28, 2008

(51) Int. Cl.
*G06F 9/24* (2006.01)
*G06F 15/177* (2006.01)

(52) U.S. Cl. ............................... 713/2; 713/1; 713/100; 709/230; 726/2; 370/254

(58) Field of Classification Search ...................... 713/2, 713/1, 100; 709/230; 726/2; 370/254
See application file for complete search history.

(56) References Cited

U.S. PATENT DOCUMENTS

| | | | |
|---|---|---|---|
| 6,345,294 B1 | 2/2002 | O'Toole et al. | |
| 6,466,985 B1 | 10/2002 | Goyal et al. | |
| 6,757,723 B1 | 6/2004 | O'Toole et al. | |
| 6,857,069 B1 | 2/2005 | Rissmeyer et al. | |
| 6,895,590 B2 | 5/2005 | Yadav | |
| 7,155,537 B1 | 12/2006 | Weber et al. | |
| 7,398,337 B2 | 7/2008 | Amdt et al. | |
| 2003/0126242 A1 | 7/2003 | Chang | |
| 2003/0145045 A1 | 7/2003 | Pellegrino et al. | |
| 2004/0078679 A1 | 4/2004 | Cagel et al. | |
| 2004/0210649 A1 | 10/2004 | Bhogal et al. | |
| 2005/0138346 A1 | 6/2005 | Cauthron | |
| 2005/0216715 A1 | 9/2005 | Matheny et al. | |
| 2006/0013251 A1 | 1/2006 | Hufferd | |
| 2006/0056630 A1* | 3/2006 | Zimmer et al. ............... | 380/256 |

(Continued)

FOREIGN PATENT DOCUMENTS

EP 1708422 A2 10/2006
JP 2005071242 3/2005

OTHER PUBLICATIONS

R. Droms, "Dynamic Host Configuration Protocol", Mar. 1997, pp. 1-45, Bucknell University.

(Continued)

*Primary Examiner*—Thomas Lee
*Assistant Examiner*—Michael J Brown
(74) *Attorney, Agent, or Firm*—Dillon & Yudell LLP

(57) ABSTRACT

A method and system that enable system firmware to efficiently boot an operating system (OS) and/or client program from a network-connected Internet Small Computer Systems Interface (iSCSI) device. The method generally comprises: (1) defining the firmware representation of the iSCSI device within the hierarchical data structure that represents the system hardware; and (2) extending the network support package to accommodate additional boot arguments that allow system firmware to acquire the information required for booting from the network-connected iSCSI device, while utilizing one of the existing discovery protocols.

19 Claims, 6 Drawing Sheets

U.S. PATENT DOCUMENTS

| | | | |
|---|---|---|---|
| 2006/0205388 A1 | 9/2006 | Semple et al. | |
| 2006/0251257 A1 | 11/2006 | Haverinen et al. | |
| 2006/0256736 A1 | 11/2006 | Koehler et al. | |
| 2007/0204103 A1 | 8/2007 | Wilkinson et al. | |
| 2008/0126586 A1* | 5/2008 | Shih ............................ | 710/10 |

OTHER PUBLICATIONS

M. Chadalapaka, "Internet Small Computer Systems Interface", Apr. 2004, pp. 1-211, The Internet Society.

D. Missimer, "Bootstrapping Clients Using the Internet Small Computer System Interface (iSCSI) Protocol", Sep. 2005, pp. 1-12, The Internet Society.

"Open Firmware Recommended Practice: TFTP Booting Extension Version 1.0", Aug. 22, 2006, Open Firmware Working Group, http://playground.sun.com/1275/practice/obp-tftp/tftp1_0.pdf.

"PowerPC Microprocessor Common Hardware Reference Platform (CHRP) Binding (Accepted version 1.8, Feb. 2, 1998)", Open Firmware Working Group, http://playground.sun.com/1275/home.html#OFDplatCHRP.

Office Action mailed on Jun. 25, 2009 for U.S. Appl. No. 11/678,124 entitled "Method to Enable InfiniBand Network Bootstrap".

Office Action mailed on Jul. 6, 2009 for U.S. Appl. No. 11/678,132 entitled "Method to Add IPV6 and DHCP Support to the Network Support Package".

Office Action mailed on Jul. 6, 2009 for U.S. Appl. No. 11/678,133 entitled "Method to Enable InfiniBand Network Bootstrap".

* cited by examiner

METHOD TO ENABLE FIRMWARE TO BOOT A SYSTEM FROM AN ISCSI DEVICE

BACKGROUND OF THE INVENTION

1. Technical Field

The present invention generally relates to computer systems and in particular to the boot processes of computer systems. Still more particularly, the present invention relates to a method and system for completing a boot process of a computer system from an Internet Small Computer Systems Interface (iSCSI) device.

2. Description of the Related Art

Following power-on (or reboot) of a computer system, the system undergoes a boot process by which the system's firmware prepares the system for operation by identifying and setting up/initiating devices in the system. During the boot process, the firmware represents system hardware as a hierarchy of interconnected buses with attached devices. This hierarchical representation usually describes user configuration choices, and contains firmware device drivers for hardware devices and support routines for use by those drivers.

Additionally, the firmware prepares the computer system for operation by loading (booting) an operating system from some storage location/device. During normal operation of a standalone computer system, when a user issues a boot command to the computer, the computer responds to the boot command by attempting to retrieve the operating system files from the computer system's local memory. Configuration data files are also needed to configure the specific system with the hardware parameters necessary for the specific hardware configuration.

Some computer systems are connected via a network to a server or other network-accessible device. With standalone systems where the computer's storage is locally maintained when the power is turned off, the OS is typically stored in the computer system itself. In other systems with temporary (volatile) storage that is lost when the power is turned off (or even with systems having limited non-volatile storage capability), the computer is not able to retrieve the boot information from within the computer itself. In such cases, the computer system's firmware may be configured to send a request for the OS files via the network to a server acting as a boot server. Remote boot operations are becoming common in the world of distributed and network computing, particularly given the advantages of booting from a boot server, such as saving the limited memory resources of the computer system.

When new devices are created, existing computer systems are typically not able to boot a client program or operating system from these new devices unless the firmware provides some sort of support for this boot process. This inability of existing systems (absent specifically-provided firmware) to complete the boot process for new devices is particularly true when the new devices do not fit the characteristics of previously defined device types or standard device types typically present in a system. One such new device that is being utilized more frequently, but has not been provided direct firmware support, is an Internet Small Computer Systems Interface (iSCSI) device.

The iSCSI protocol allows a client system to use an iSCSI initiator to connect to remote targets such as disks and tape drives on an IP network for block level input/output (I/O). The SCSI architecture is based on a client/server model, where the client ("initiator") is typically a host system, such as a file server, that issues requests to read or write data and the server ("target") is a resource such as a disk array that responds to client requests. The server (target) comprises one or more logical units that are assigned identifying numbers, or logical unit numbers (LUNs). Those skilled in the art are familiar with iSCSI protocol and its general implementation. Further description of that protocol may be obtained at RFC 3720: Internet Small Computer Systems Interface (iSCSI), published in the IETF (Internet Engineering Task Force) RFC repository.

Because iSCSI protocol has not been fully integrated into existing system functions, such as firmware-directed remote boot operations, conventional systems utilize several existing discovery protocols to obtain information about the iSCSI client and target from well-known servers. A description of these existing discovery protocols is provided within an article titled "Bootstrapping Clients using the iSCSI Protocol," published online by IETF RFC 4173 at website "www.ietf.org/rfc/rfc4173.txt." However, there is currently no efficient way to provide a directed boot process for booting an operating system from an iSCSI device (target). The present invention thus recognizes that a need exists for an iSCSI client to efficiently boot its operating system from an iSCSI device (target) without requiring a complete redesign/revamp of the existing remote booting processes and discovery protocols.

SUMMARY OF THE INVENTION

Disclosed are a method and system that enable system firmware to efficiently boot an operating system (OS) and/or client program from a network-connected Internet Small Computer Systems Interface (iSCSI) device. The method generally comprises: (1) defining the firmware representation of the iSCSI device within the hierarchical data structure that represents the system hardware; and (2) extending the network support package to accommodate additional boot arguments that allow system firmware to acquire the information required for booting from the network-connected iSCSI device, while utilizing one of the existing discovery protocols.

The specific methods of the invention are provided from an understanding that, in order to boot a system from an iSCSI device, the system's boot firmware needs to recognize iSCSI hardware or enable iSCSI software initiators, identify the iSCSI client and the target iSCSI device, establish communication with the target, and load the boot file from the target. The hierarchical nature of the firmware data structure representing the devices allows information to be passed among parent and children devices and between devices and support packages. According to one embodiment, an iSCSI device type is characterized as a network-like device type in order to leverage the extended network support package and thus utilize network services to discover and acquire the different components of the iSCSI device address. With this hierarchical representation, the iSCSI device provides the network-specific boot parameters (e.g., speed, mode, etc.) and passes those boot parameters to the network support package. The network support package acquires and processes the components of the iSCSI device address and passes those arguments (i.e., the boot parameters) to the disk support package. The disk support package then loads the boot image and forwards the OS to the iSCSI client to enable completion of the boot of the OS at the iSCSI client.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
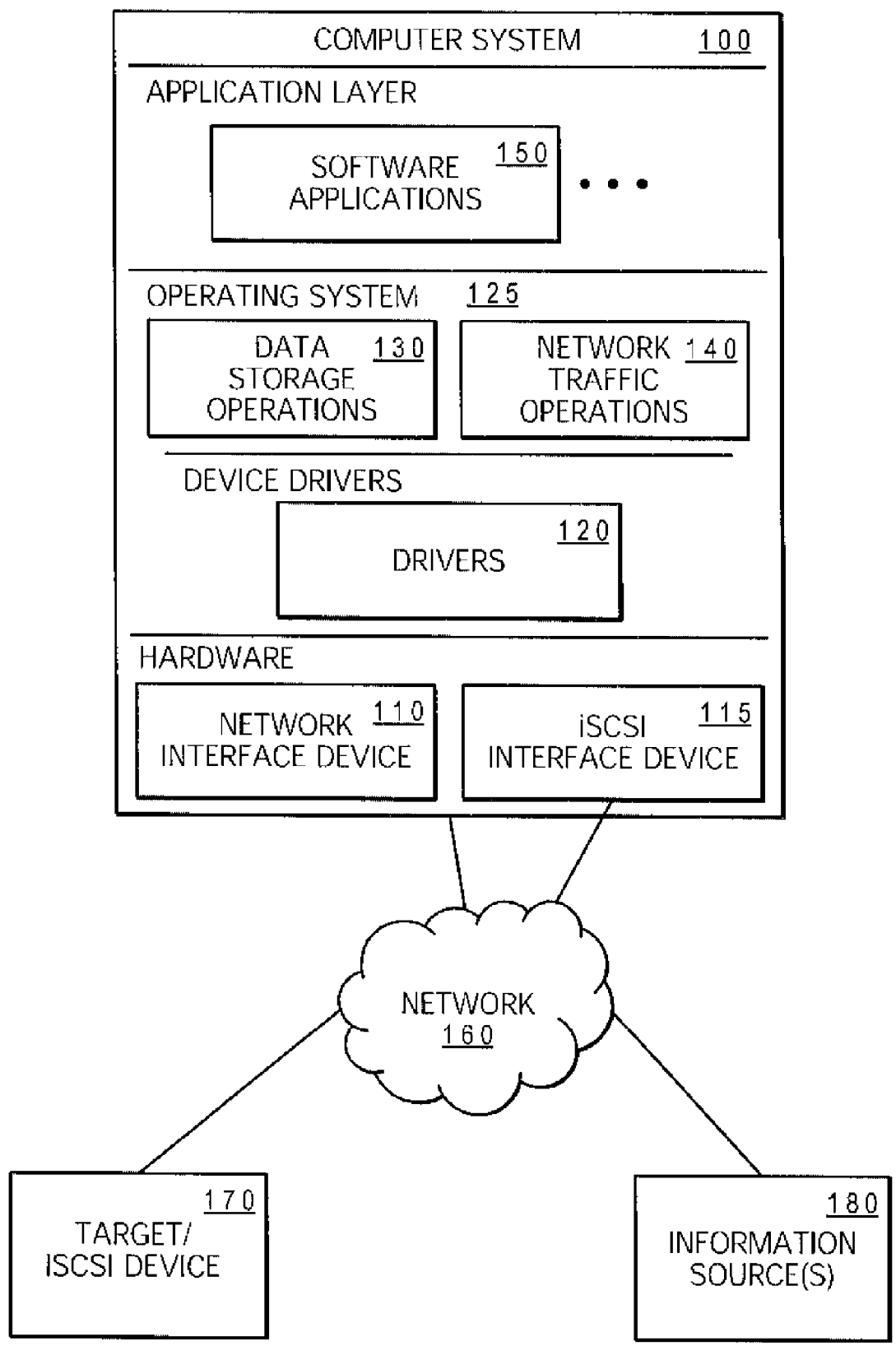
FIG. 1 is a block diagram illustrating an example computer system (client) coupled to an Internet Small Computer System Interface (iSCSI) device (target) via a network, in accordance with one embodiment of the invention.

The present invention provides a method and system that enable system firmware to efficiently boot an operating system (OS) and/or client program from a network-connected Internet Small Computer Systems Interface (iSCSI) device. The method generally comprises: (1) defining the firmware representation of the iSCSI device within the hierarchical data structure that represents the system hardware; and (2) extending the network support package to accommodate additional boot arguments that allow system firmware to acquire the information required for booting from the network-connected iSCSI device, while utilizing one of the existing discovery protocols.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

With reference now to the figures, FIG. 1 is a block diagram illustrating a structural representation of computer system 100 connected via network 160 to remote iSCSI device (170) (e.g., network storage, boot server, or target) and one or more information sources 180. Throughout this description of illustrative embodiments, iSCSI device 170 may interchangeably be referred to as "target" or "iSCSI server" or "boot server." Computer system 100 may also be referred to as "initiator" or "client" or "client device" or "iSCSI client." Computer system 100 may be a personal computer, a server, a mobile or handheld electronic device, or other data processing device. Network 160 may be a local area network, metropolitan area network, wide area network, or other type of computer network. Network 160 may be a wired or wireless network and may use a connectionless packet-switched protocol, such as Internet Protocol (IP), and/or other network protocols.

Computer system 100 includes network interface device 110 that connects computer system 100 to network 160. Network interface device 110 represents a hardware component of computer system 100 and may be a network interface card (NIC) or an integrated network device (e.g., a network adapter built into a main circuit board, such as a motherboard, of computer system 100).

Device drivers 120 control network interface device 110, providing a conduit through which operating system (OS) 125 and one or more software applications 150 in an application layer of computer system 100 may communicate with network 160. Device drivers 120 allow data storage operations 130 to be performed over the network 160 using network interface device 110. For example, device drivers 120 may include an iSCSI initiator that allows SCSI commands to interact with storage target (iSCSI device 170) over network 160.

At least one of device drivers 120 may support booting to iSCSI device 170 over network 160, in which case iSCSI device 170 represents a remote boot device. As a remote boot device, iSCSI device 170 is initialized before loading a boot image (of an operating system) to computer system 100 via a series of processes completed over network 160. The iSCSI device 170 may be located in physical space either close to or far away from computer system 100. For example, the iSCSI device 170 may be connected to computer system 100 through a local area network 160 (e.g., a gigabit Ethernet) and may be located in the same building, rack, or cabinet as computer system 100.

Additionally, device drivers 120 allow network traffic operations 140 to be performed over network 160 using network interface device 110. At least one of device drivers 120 may present itself as a network device driver to the operating system and support general purpose network traffic. Thus, the operating system may view and interact with one of the drivers 120 as though the driver was a conventional network device driver loaded after bus drivers and storage drivers in the machine boot process. The network traffic supported may include multiple different networking protocols, such as TCP/IP, ODI (Open Data-link Interface), PXE (Pre-Boot Execution Environment), and various other standardized and/or company/operating system based networking protocols, depending upon implementation. In general, device drivers 120 allow computer system 100 to communicate with one or more information sources 180 using multiple networking protocols.

Although device drivers 120 of computer system 100 appear in FIG. 1 to be in a layer separate from the operating system and the hardware, it should be understood that the device drivers may operate in different contexts within computer system 100 depending upon implementation and the state of operation, from power off, through the boot sequence, up until an operational mode is reached, where the operating system is fully loaded and in control of computer system 100. Moreover, various driver functions described herein can be implemented in hardware, firmware and/or software.

As described above, device drivers 120 may support booting to a remote boot device (iSCSI device 170) and support general purpose network traffic, while at least one of device drivers 120 presents itself as a network device driver to the operating system. Booting to the remote boot device may be done using iSCSI, where SCSI commands are encapsulated in the TCP/IP protocol. An iSCSI boot typically involves booting through one or more (usually two) iSCSI initiators to an iSCSI target. These iSCSI initiators are typically software/firmware that execute within computer system 100 and utilize the existing network interface device 110 to access the iSCSI target via network 160. An iSCSI initiator is the requestor/recipient of data from an iSCSI target, and the iSCSI target typically either has the data stored thereon, which data is accessible to the iSCSI initiator and returned in response to receipt of the request. In the case of two iSCSI initiators, one or both of the initiators may reside in firmware or be delivered through PXE. Also, one of the initiators may interface with the operating system to which computer system 100 is booting. In some implementations, and as provided within FIG. 1, computer system 100 comprises an iSCSI TCP Offload Engine (TOE) 115, which is a separate hardware device utilized in lieu of the software iSCSI initiator(s) to communicate with the target/iSCSI device 170, without requiring network interface device 110.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The computer system depicted in FIG. 1 may be, for example, an IBM eServer pSeries system, a product of International Business Machines Corporation in Armonk, N.Y.

In FIG. 1, when an iSCSI TOE is not provided within computer system 100, software iSCSI initiators are provided to the device drivers and initiate the connections to the target/iSCSI device 170 via network interface card 110. To enable this operation, the computer system firmware loads bus drivers. For example, many current firmware installations of the operating system allow the addition of third party SCSI drivers at a SCSI driver insertion point, and device drivers 120 may be loaded at this point in the boot up sequence.

Figure 2:
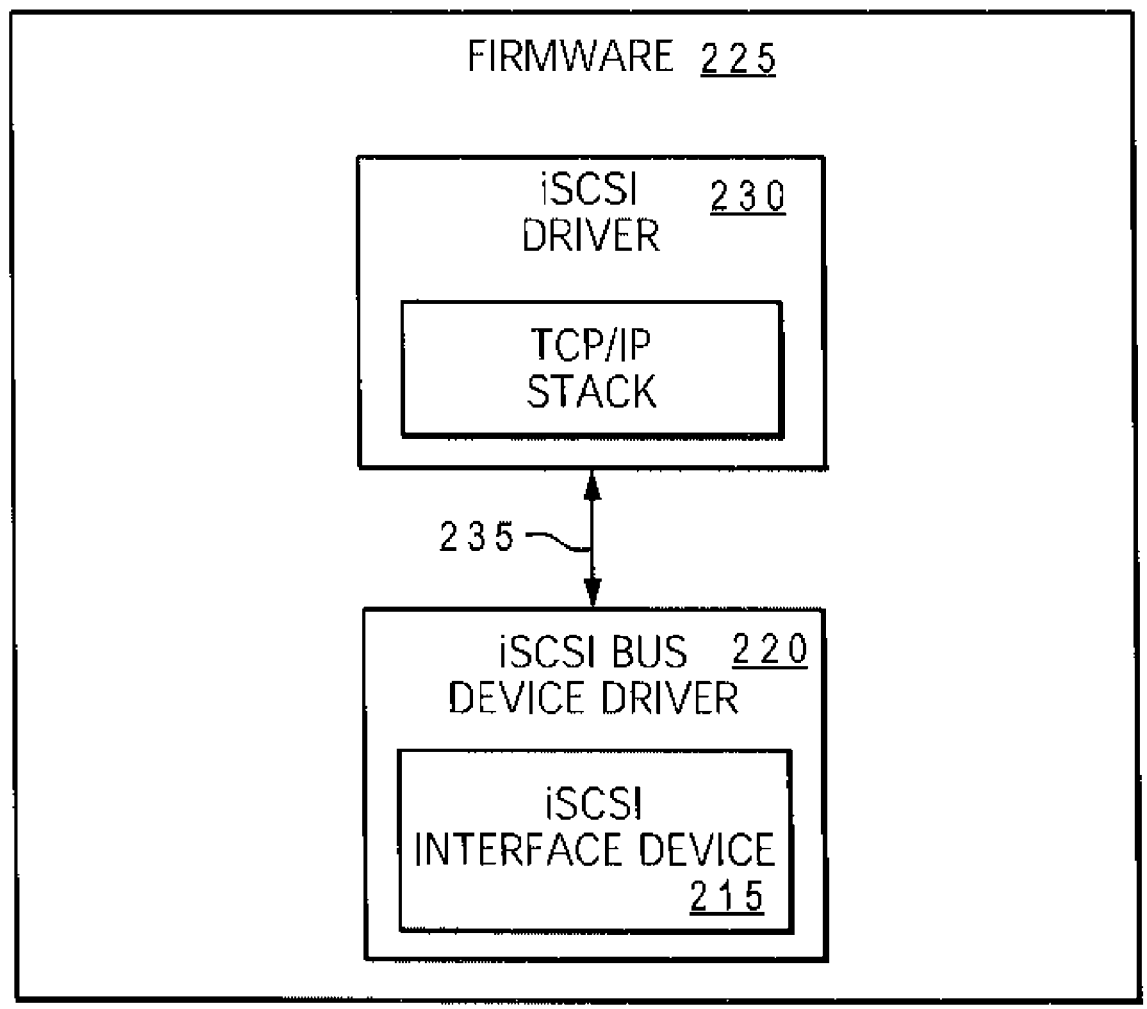
FIG. 2 is a block diagram illustrating internal layout (hardware and software structure) of the computer system of FIG. 1, according to one embodiment of the invention.

FIG. 2 illustrates an example device driver architecture and other software components that enable computer system 100 (of FIG. 1) to communicate with network 160 (FIG. 1) via an iSCSI TOE, prior to loading of the operating system. In one embodiment, the device driver architecture enables the iSCSI TOE to access network 160 and connect to the boot server device (e.g., target/iSCSI device 170 of FIG. 1) before the operating system is loaded.

In FIG. 2, the computer system is an iSCSI client equipped with an iSCSI TOE. As shown, firmware 225 provides iSCSI bus device driver 220, which includes iSCSI (hardware) interface device 215 that communicates directly with the network. The iSCSI driver 230 contains its own TCP/IP stack to enable connection to the target/iSCSI device over the network to retrieve the boot image. The iSCSI driver 230 generates iSCSI traffic 235 in response to iSCSI boot operations. During system boot, firmware 225 installs iSCSI driver 230 and iSCSI bus device driver 220 to enable iSCSI boot operations via iSCSI interface device 215. In this driver architecture, the device driver that controls the hardware interface (e.g., the iSCSI bus device driver 220) distinguishes between received responses to machine bus commands and other network traffic.

With the above example computer system and network environment, the various features of the invention are implemented as described below. The described embodiment references the standard support package for network devices. This standard support package is described in Open Firmware Recommended Practice: TFTP Booting Extension Version 1.0, published by the Open Firmware Working Group. (Confirmed published on Aug. 22, 2006 at http://playground.sun.com/1275/practice/obptftp/tftp1_0.pdf#search=%22Open-%20Firmware%20Recommended%20Practice%3A%20-TFTP%20Booting%20Extension%20Version%201.0%22) The content of that document, where relevant to the description of the features of the invention, is incorporated herein by reference.

The specific methods of the embodiments of the invention are described from an understanding that, in order to boot a system from an iSCSI device, the system's boot firmware 225 needs to recognize iSCSI hardware (or enable iSCSI software intiators), identify the iSCSI client and the target iSCSI device, establish communication with the target, and load the boot file from the target. The hierarchical nature of the firmware data structure representing the devices allows information to be passed between devices and support packages.

According to one embodiment, when an iSCSI TOE is provided within computer system 100, the firmware characterizes an iSCSI initiator as a network-like device type in order to leverage the extended network support package and thus utilize network services to discover and acquire the different components of the target iSCSI device address. With this hierarchical representation, the iSCSI device (initiator) provides the network-specific boot parameters (e.g., speed, mode, etc.) and passes those boot parameters to the network support package. The network support package acquires and processes the components of the iSCSI device address and passes those arguments (i.e., the boot parameters) to the disk support package. The disk support package then loads the boot image and forwards the boot image to the iSCSI client to enable completion of the boot of the operating system at the iSCSI client.

The network support package provides support for booting a system using a boot file found on a remote server. As further described within the above reference, the support package also covers the use of the bootstrap protocol (BOOTP) to find a boot server and obtain the boot file using a standard set of established boot arguments. The present invention provides extensions/enhancements to the network support package to accommodate additional, new boot arguments that allow the network support package to identify iSCSI device address components by using discovery protocols. As provided by the embodiments described herein, these extensions/enhancements apply to iSCSI devices as well as "network" devices.

The standard support package for network devices provides support for booting a system using a boot file found on a remote server. Further, the support package also provides for the utilization of the BOOTP bootstrap protocol to find a boot server and the boot file. In order to boot a system from an iSCSI device, however, boot firmware processing is required to (a) identify the iSCSI client and the target, (b) establish communication with the target, and (c) load the boot file from the target (or child device). The extensions to the network support package provided by one embodiment of the invention are described below.

One type of extension to the network support package provided by one embodiment of the invention enables the network support package to accommodate boot arguments that allow firmware to identify iSCSI device address components in ways that include the use of existing and future discovery protocols. These first extensions apply to iSCSI devices and "network" devices as well, to accommodate the case where the software iSCSI initiator establishes an iSCSI session, in the absence of iSCSI TCP Offload Engine (TOE) hardware.

Another type of extension adds a mechanism to the network support package to distinguish between different types of bootstrap methods, (e.g., TFTP bootstrap vs. iSCSI bootstrap) and the methods' respective boot arguments. According to one embodiment of the invention, bootstrap methods are selected using "command keywords" that are added before the first boot argument. Multiple command keywords are defined to specify different bootstrap methods and their associated boot arguments. The command keyword defines/determines the bootstrap method and the set of boot arguments associated with the method. Since the current set of boot arguments defined corresponds to the TFTP bootstrap method, absence of a command keyword, as provided by one embodiment of the invention, implies the use of the TFTP bootstrap method. In one embodiment, the command keywords are mutually exclusive. In this embodiment, only one command keyword is allowed in the arguments, and entry of multiple command keywords results in an error being reported. The various boot arguments are then defined as either required or optional.

One or more discovery protocols may be utilized to acquire the boot arguments associated with the selected bootstrap method. As utilized herein, a discovery protocol defines both a mechanism to establish a connection with a remote server and the information that is obtainable from that particular server. For example, the Dynamic Host Configuration Protocol (DHCP) may be utilized to obtain configuration parameters, such as the client address, the BOOTP protocol may be utilized to obtain information about the iSCSI target, and the internet Storage Name Server (iSNS) protocol and the Service Location Protocol (SLP) may be utilized to obtain iSCSI client and iSCSI target information. According to one embodiment, specific discovery protocols are selected using "qualifier keywords" that are inserted after the command keyword and before the first argument. Each qualifier keyword identifies a well known discovery protocol as well as the boot arguments that are/may be acquired by using that discovery protocol. Multiple qualifier keywords may be specified after a command keyword. Examples of qualifier keywords, as provided by the invention include, but are not limited to, dhcp, bootp, isns, and slp, which identify the DHCP, BOOTP, iSNS, and SLP protocols, respectively.

Embodiments in which the extensions are applied to network devices are provided in order to accommodate cases where a software iSCSI initiator is utilized to establish an iSCSI session, in the absence of iSCSI TCP offload Engine (TOE) hardware. An iSCSI TOE device performs encapsulation of the iSCSI commands and provides the Ethernet hardware for transmitting the iSCSI commands over a network.

Thus, as further described below, additional boot arguments (keywords) are established and added to the arguments utilized by network support package to (1) distinguish between different types of bootstrap methods, i.e., TFTP bootstrap vs. iSCSI bootstrap and their respective boot arguments and (2) specify discovery protocols to obtain missing boot parameters required during OS boot processing from an iSCSI device.

The iSCSI protocol encapsulates SCSI commands into network packets for transmission between a client (the iSCSI initiator), e.g., computer system 100, and an iSCSI target (170). A standard iSCSI device address contains the following information:
 (a) IP address of iSCSI target server (target-server);
 (b) TCP port number, which defaults to 3260 (target-port);
 (c) iSCSI target name (target-name); and
 (d) iSCSI LUN, which defaults to 0 (target-lun).

Additionally, the following additional information can be used in the iSCSI protocol to enable access to an iSCSI device in a secure environment:
 (a) CHAP target ID (target-chapid); and
 (b) CHAP password (target-chappw).

According to embodiments of the invention, when an iSCSI TOE is provided within the client device, (e.g., computer system 100 of FIG. 1), the iSCSI device is represented as a network-like device type within the hierarchical firmware data structure. Therefore, this iSCSI device type is described by the same type of information utilized to describe a network device (i.e., machine (MAC) address, frame size, supported network types, etc). One of the advantages of the network-like device type representation is that the network support package may be leveraged by an iSCSI device type. Network services may thus be utilized to discover and acquire the different components of the iSCSI device address.

The hierarchical nature of the firmware data structure representing the devices allows information to be passed between devices and support packages. With the presence of an iSCSI TOE device, the OS boot function is provided by the children device(s), and the arguments of this boot function are passed to the disk-support package. With the representation of the iSCSI device as a network-like device, however, the iSCSI device provides network-specific boot parameters (i.e., speed, mode, etc.) and passes these parameters to the network support package. The network support package processes the boot arguments, acquires the iSCSI device address and other parameters from an information server, and passes those parameters to the disk-support package. Regardless of the iSCSI device representation, the disk-support function performs the actual load of the boot file.

As previously introduced, in order to support the representation of the iSCSI device type as a network-type device, the network support package is extended, according to one embodiment of the invention. The remaining descriptions of embodiments of the invention apply whether utilizing the representations of a software iSCSI initiator or an iSCSI hardware TOE to boot from the target iSCSI device.

Figure 3:
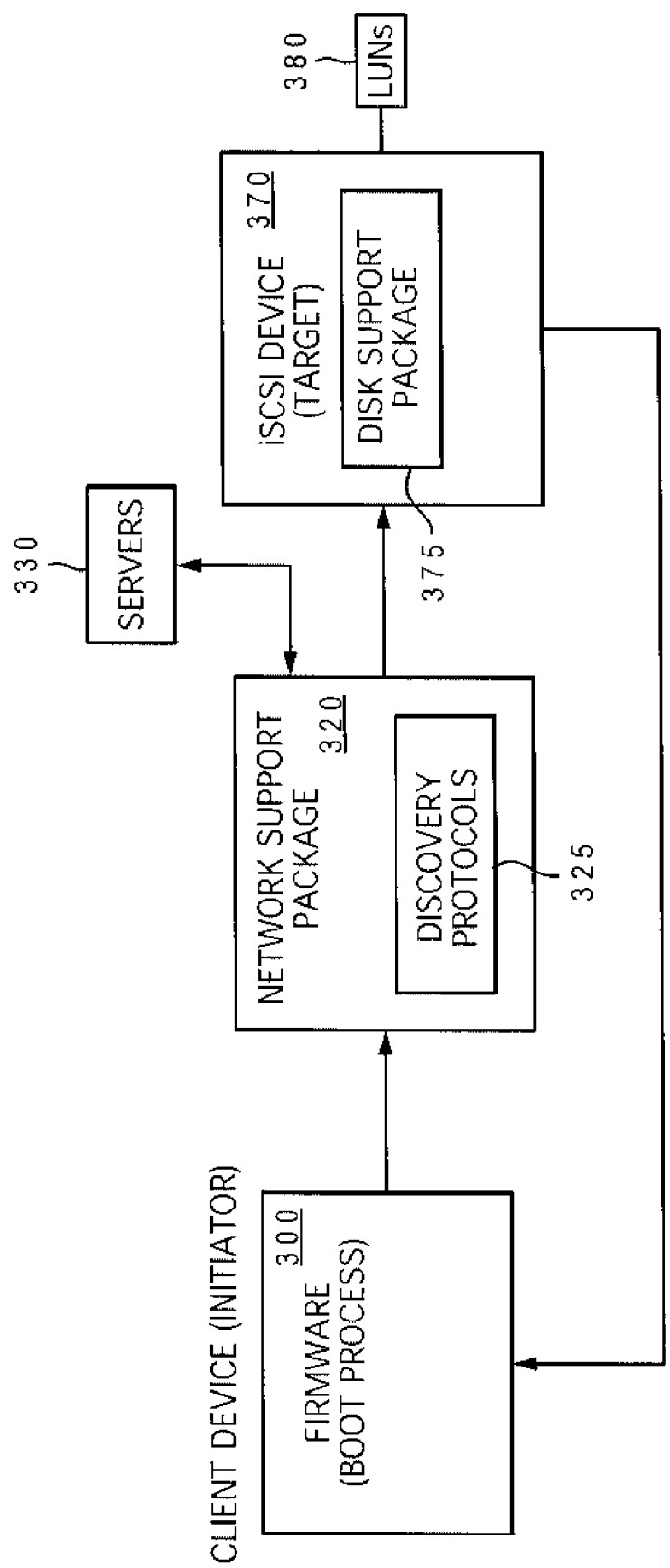
FIG. 3 illustrates an example process flow by which a system firmware communicates arguments and parameters to a network support package and ultimately the iSCSI device (target) to enable retrieval and boot up of the OS from the iSCSI device, according to one illustrative embodiment of the invention.

With reference again to the figures, and in particular to FIG. 3, there is provided an example system illustrating primary components (hardware/software) that enable the remote boot processing from an iSCSI device (target) according to one illustrative embodiment of the invention. As shown, the system comprises firmware 300 of client device (initiator), e.g., computer system 100, communicatively coupled to network support package 320. Network support package 320 is in turn communicatively coupled to servers 330 and iSCSI device (target) 370. According to the described embodiment, servers 330 represent the collective of different server types that may be accessed by corresponding discovery protocols 325 to obtain parameters required for accessing iSCSI device 370. The iSCSI device 370 comprises disk support package 375, which is utilized to access logical units 380 associated with (or accessible from) iSCSI device 370. Disk support package 375 enables remote OS boot operations to be completed at client device 100 based on arguments provided by system firmware 300 to network support package 320.

Figure 4:
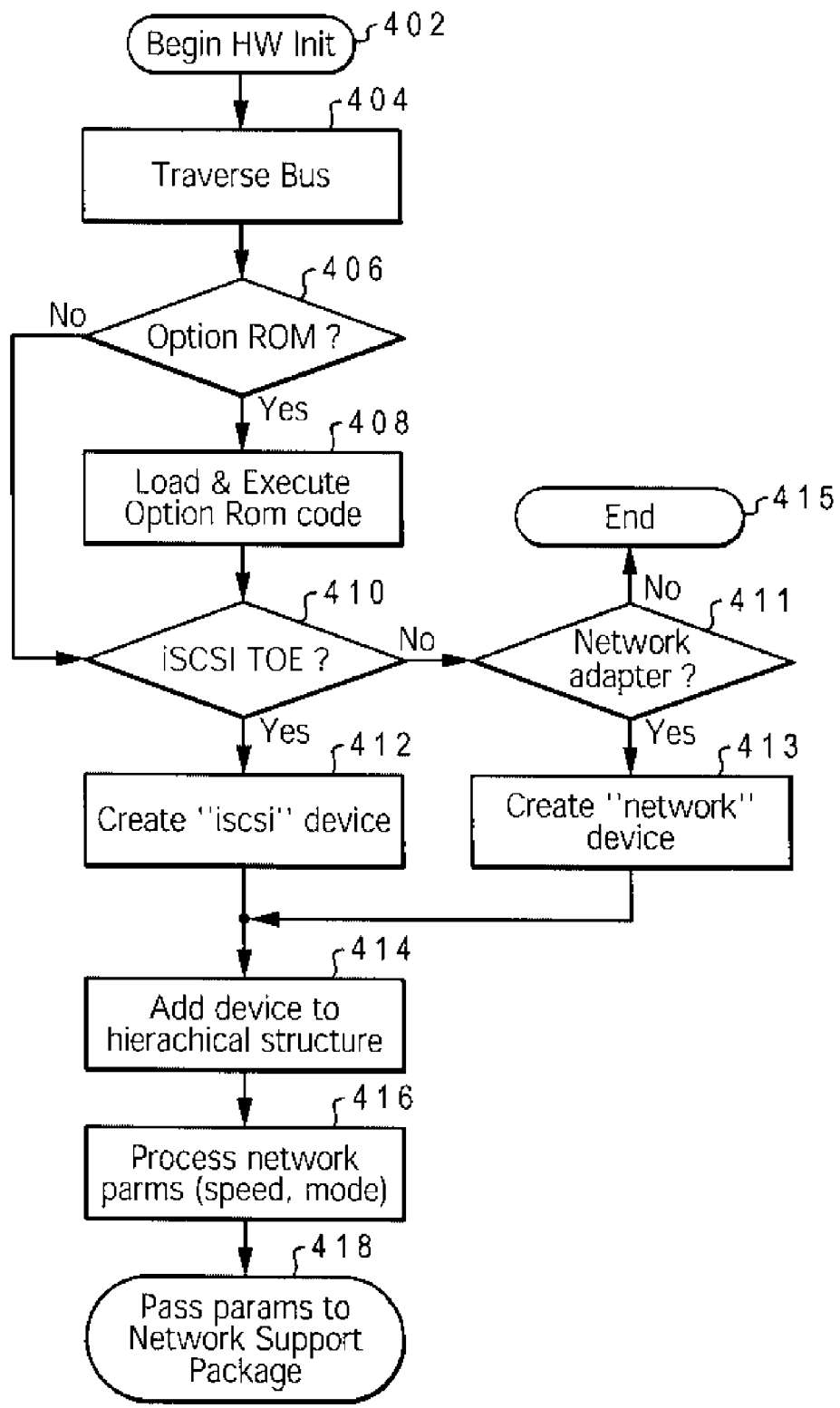
FIG. 4 is a flow chart illustrating the process of representing the iSCSI device within the firmware generated hierarchical structure and transferring boot parameters to the network support package, in accordance with an illustrative embodiment of the invention.

Turning now to FIG. 4, which illustrates the process by which the iSCSI device is identified within the hierarchical structure during firmware initialization of devices and subsequent transfer of arguments to the network support package to trigger the remote OS boot operation. Specifically, the flow chart illustrates the process of device discovery by the firmware until network parameters are transferred to the network support package. The process begins when system boot up is initiated, as shown at block 402. As depicted at block 404, the firmware traverses the system bus(es) in search of devices that may include an option ROM (Read Only Memory). This search is a part of the process of identifying the I/O topology of the system. At block 406, the firmware checks whether an option ROM is detected. If an option ROM is detected in any of the devices attached to the bus, the option ROM is loaded and its code executed, as shown at block 408. Once the option ROM code is executed or if no option ROM is detected, the firmware checks, at block 410, whether an iSCSI TOE adapter is found/detected. If an iSCSI TOE adapter is found/detected, then the firmware creates a representation of the iSCSI TOE (i.e., an iSCSI device), as shown at block 412, and the iSCSI device representation is added to the main hierarchical firmware structure, as shown at block 414.

If, at block 410, the firmware does not detect an iSCSI TOE, the firmware then checks at block 411 whether a network adapter is detected. If no network adapter is detected, the process ends at block 415. If a network adapter is detected, the firmware creates a "network" device, as shown at block 413, and the network device is added to the main hierarchical firmware structure at block 414. The discovered iSCSI device or the created network-type device causes the firmware to process network-related boot arguments (e.g., speed, mode, etc.), as shown at block 416. Following block 416, the parameters are passed to the network support package which assists in the booting process, as indicated at block 418. Through the hierarchical nature of the I/O topology representation, read and write operations sent to the network support package are ultimately performed by the target iSCSI device whether the iSCSI initiator is a "network" device or an iSCSI device.

Figure 5:
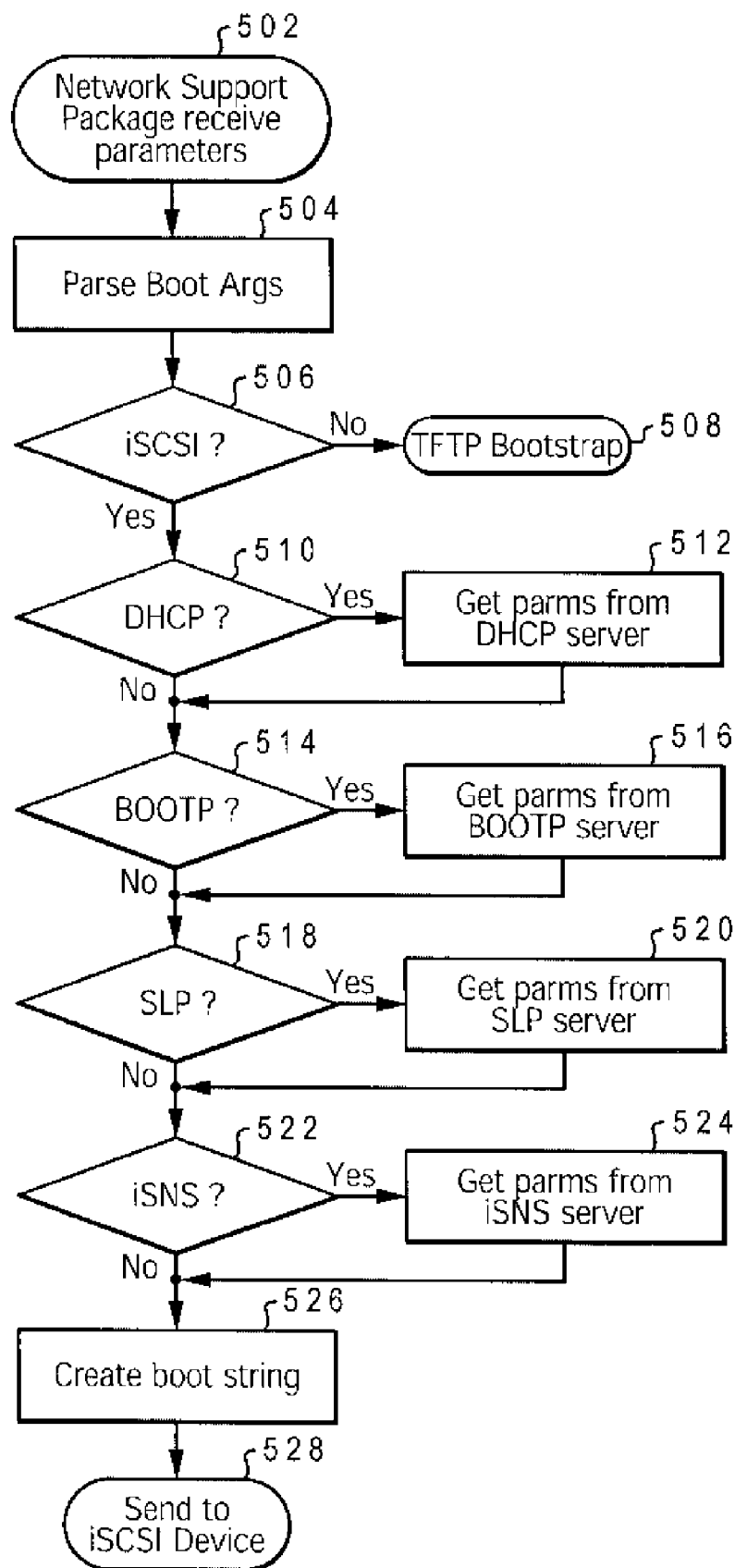
FIG. 5 is a flow chart illustrating the process of retrieving additional boot arguments via a selected discovery process for transfer to the iSCSI device (target), according to an illustrative embodiment of the invention.

Referring now to FIG. 5, which is a flow chart illustrating the processing provided by the network support package on receipt of the boot arguments generated and forwarded at the end of the hardware initialization process of FIG. 4. Specifically, FIG. 5 illustrates the processing of the qualifier keywords performed by one embodiment of the network support package when the iSCSI bootstrap method is selected. Whether a software iSCSI initiator is used along with a "network" device or the hardware iSCSI initiator in an iSCSI TOE device is used, the parameters associated with the iSCSI bootstrap method are passed from the device (iSCSI TOE or "network" device) to the network support package. The network support package receives the boot arguments, as shown at block 502, and the network support package parses the boot arguments, as provided at block 504. At block 506, network support package determines whether the boot arguments include a keyword which indicates or corresponds to an iSCSI discovery process. If the arguments do not include the iSCSI-specific keyword, the network support package initiates a standard TFTP bootstrap process, as indicated at block 508. According to one embodiment, when the TFTP method is selected, the boot arguments provided are:

[bootp,] siaddr,filename,ciaddr,giaddr,bootp-retries,tftp-retries, subnet-mask,blksize However, according to one embodiment of the invention, a specific set of boot arguments are required to define the iSCSI command keyword in order to select the iSCSI bootstrap method and its corresponding boot arguments. Thus, when the iSCSI bootstrap method is selected, a set of iSCSI-related parameters (keywords) is provided, followed by disk-related arguments. These disk-related arguments are passed to the disk support package by the open method of the network support package. Those skilled in the art are familiar with disk arguments, which are further described in *PowerPC Microprocessor Common Hardware Reference Platform* (*CHRP*) *Binding*, published by the Open Firmware Working Group. Relevant content of that publication are incorporated herein by reference.

According to one embodiment of the invention, the boot arguments associated with the iSCSI bootstrap method include the following: iscsi, [itname=init-name,] [ichapid=init-chapid,] [ichappw=init-chappw,] ciaddr=initaddr, [giaddr=gateway-addr,] [subnet-mask=net-mask,] siaddr=target-server, [iport=target-port,] iname=target-name, [ilun=target-lun,] [chapid=target-chapid,] [chappw=target-chappw,] disk-args.

When a qualifier keyword is added to select a discovery protocol for the iSCSI method, in one embodiment of the invention, the boot arguments take the form of: iscsi, [dhcp [=diaddr],] [bootp,] [slp[=SLP-server],] [isns=iSNS-server,] [itname=init-name,] [ichapid=init-chapid,] [ichappw=init-chappw,] ciaddr=init-addr, [giaddr gateway-addr,] [subnetmask=net-mask,] siaddr=target-server, [iport=target-port,] iname=target-name, [ilun=target-lun,] [chapid=target-chapid,] [chappw=target-chappw,] disk-args.

Within these arguments, the following terms are defined/described:

(a) dhcp [=diaddr] is an optional parameter that indicates that a Dynamic Host Configuration Protocol (DHCP) server is used to obtain configuration parameters. A diaddr value may be optionally provided and specifies the internet address of the DHCP server to be used. Otherwise, a broadcast query is performed to locate/find a DHCP server. The diaddr value is expressed in IPv6 or IPv4 notation, depending on whether the qualifier keyword IPv6 is specified or not. Methods by which network support package is modified/enhanced to support use of IPv6 and DHCP within the extended boot arguments are described in greater detail within commonly assigned and co-pending patent application Ser. No. 11/678132. Relevant content of that application is incorporated herein by reference. A DHCP server may provide the iSCSI initiator address (ciaddr), the iSCSI target address (siaddr), the iSCSI target port (iport), the iSCSI target lun (ilun) and the iSCSI target name (iname).

(b) bootp is an optional constant that specifies BOOTP as the "discovery" protocol to obtain the parameters needed to boot over a network. A BOOTP server may provide the iSCSI target address (siaddr), the iSCSI target port (iport), the iSCSI target lun (ilun) and the iSCSI target name (iname).

(c) isns=iSNS-server is an optional keyword value that indicates that an iSNS server is used to obtain parameters associated with iSCSI boot. The iSNS-server value is the internet address of the internet Storage Name Server (iSNS). This IP address is expressed in IPv6 or IPv4 notation, depending on whether the optional keyword IPv6 is specified or not. The iSNS server may provide the iSCSI target name (iname) for iSCSI boot. Given the iSCSI target name, the iSNS provides the iSCSI target server address (siaddr) and iSCSI target port (iport).

(d) slp [=SLP-server] is an optional parameter that indicates that an SLP server is used to obtain parameters required for booting. An SLP-server value may be optionally provided and specifies the internet address of the Service Location Protocol (SLP) server to be used. Otherwise, a broadcast query is performed to find the SLP server. The SLP-server value is expressed in IPv6 or IPv4 notation, depending on whether the optional keyword IPv6 is specified or not. The SLP server may provide the iSCSI target name (iname) for iSCSI boot. Given the iSCSI target name, the SLP server may provide the iSCSI target server address (siaddr) and iSCSI target port (iport).

(e) itname=init-name is an iSCSI RFC compliant string that represents the iSCSI initiator. The iSCSI RFC [1] specifies that a given name can be up to 223 bytes in length. The itname is used during iSCSI sessions as the transaction requestor iSCSI identity. This argument is a required parameter for a "network" device, but is an optional parameter for an iSCSI device. If itname is not specified for an iSCSI device, the default hardware value is used.

(f) ichapid=init-chapid is an IETF compliant identifier (ID) that represents the initiator CHAP ID and is used to aid in the authentication of the initiator to the target. Specifically, the initiator encodes this information during iSCSI session establishment and sends the information to the target, where the target checks that the initiator is actually valid. The ichapid may be omitted if there is no requirement for authentication and there is no requirement for an explicit initiator ID to be used in the discovery process.

(g) ichappw=init-chappw is an IETF compliant password that represents the initiator CHAP password and is used, along with the initiator CHAP ID, to aid in the authentication of the initiator to the target. The argument may be omitted if there is no requirement for authentication.

(h) ciaddr=init-addr is the IP address of the client (i.e. the iSCSI initiator IP address). This IP address is expressed in IPv6 or IPv4 notation, depending on whether the optional keyword ipv6 is specified or not. The iSCSI initiator IP address is used during an iSCSI session as the transaction requestor IP address. It is associated with an iSCSI IQN string that represents the identity of the iSCSI initiator. This parameter is required, unless DHCP is specified.

(i) giaddr=qateway-addr is the IP address of the gateway to the iSCSI target server. This IP address is expressed in IPv6 or IPv4 notation, depending on whether the optional keyword ipv6 is specified or not. This parameter is optional and may be specified if the siaddr is known and is not in the client's subnet.

(j) subnet-mask=net-mask is a 32-bit mask that defines the local network scope of all the IP addresses on this particular subnet when IPv6 is not specified.

(k) siaddr=target-server is the IP address of the iSCSI target server. This IP address is expressed in IPv6 or IPv4 notation, depending on whether the optional keyword IPv6 is specified or not. The iSCSI target IP address is used during an iSCSI session as the transaction responder IP address. This parameter is required if a discovery protocol is not specified.

(l) iport=target-port is the TCP port number associated with the iSCSI target (target port). The iport identifies which target port number the initiator is to communicate with. This parameter may be obtained by specifying one of the discovery protocols. The parameters default value is 3260.

(m) iname=target-name is an iSCSI RFC compliant string that represents the iSCSI target. The iSCSI RFC specifies that a given name can be up to 223 bytes in length. The iname is used during an iSCSI sessions as the transaction responder iSCSI identity. This parameter is required if a discovery protocol is not specified.

(n) ilun=target-lun is the logical unit number of the iSCSI target device (target lun). This parameter may be obtained by specifying the BOOTP or DHCP protocol. The parameter's default value is O.

(o) chapid=target-chapid is an IETF compliant ID that represents the target CHAP ID of the target and is used to aid in the authentication of the target to the initiator. Specifically, the target would encode this information during iSCSI session establishment and send the parameter's argument to the initiator where the initiator would check that the target is actually valid. The parameter may be omitted if there is no requirement for authentication.

(p) chappw=target-chappw is an IETF compliant password that represents the target CHAP password and is used, along with the target CHAP ID, to aid in the authentication of the target to the initiator. The parameter may be omitted if there is no requirement for authentication.

The specific labeling of "optional" is determined based on whether (1) a default value may be assumed or (2) a discovery protocol may be utilized to obtain the value, while the labeling of "required" applies to those arguments whose values must be specified in the set of boot arguments, in accordance with the embodiment of the invention described above.

Returning now to FIG. 5, if at block 506, there is an iSCSI-specific keyword within the boot arguments, network support package then initiates a series of checks, illustrated by decision blocks 510, 514, 518, and 522 to determine which discovery process is required. While illustrated as a sequence, the various determinations may be completed concurrently rather than sequentially by network support package, or alternatively, the determinations may be completed in a different order relative to each other. At block 510, the network support package checks whether the arguments indicate a DHCP (Dynamic Host Configuration Protocol) discovery process. If a DCHP discovery process is indicated by the arguments, the network support package obtains the DCHP-stored parameters from the identified DCHP server, as shown at block 512. DCHP is described at RFC 2131: *Dynamic Host Configuration Protocol*, published by TRTF. Relevant content of that publication is incorporated herein by reference.

Network support package also checks, at block 514, whether the arguments indicate a BOOTP discovery process. If a BOOTP discovery process is indicated by the arguments, the network support package obtains the BOOTP-stored parameters from the identified BOOTP server, as shown at block 516. Similarly, at block 518, network support package checks whether the arguments indicate an SLP discovery process, and if an SLP discovery process is indicated by the arguments, the network support package obtains the SLP-stored parameters from the SLP server identified, as shown at block 520. Finally, network support package checks, at block 522, whether the arguments indicate an iSNS discovery process. If an iSNS discovery process is indicated, the network support package obtains the iSNS-stored parameters from the iSNS server, as shown at block 524.

In one embodiment, when SLP or iSNS is specified within the arguments, then one of two different processing may be enabled based on the presence or absence of "iname" within the open arguments. Accordingly, if iname is provided in the open arguments, the specified iname is utilized to query the SLP or iSNS server to obtain the iport and siaddr. However, if iname is not provided, the SLP or iSNS is queried to obtain a list of names of potential target servers.

With the specific server type and storage location of the required additional parameters, the network support package obtains missing parameters using the specific discovery protocols for the server type specified in the boot arguments. Some of the iSCSI boot parameters may be obtained through multiple discovery protocols, i.e. DHCP and BOOTP. All of the discovery protocols specified in the boot arguments may be utilized (concurrently or sequentially) to obtain the iSCSI device address and other boot parameters. In one embodiment, if a parameter is obtained from different servers, the value obtained from the last queried server will be used. Alternatively, parameter discovery may stop as soon as all the boot arguments are obtained. Once all the boot arguments are obtained, network support package creates the boot string using these additional parameters, as shown at block 526, and the network support package transmits this boot string to the iSCSI device (target) identified by the parameters. Thus, according to the described embodiments of the invention, the network support package is extended to enable iSCSI support for each of the multiple available discovery protocols, when access to an iSCSI device is required via the particular discovery process.

Figure 6:
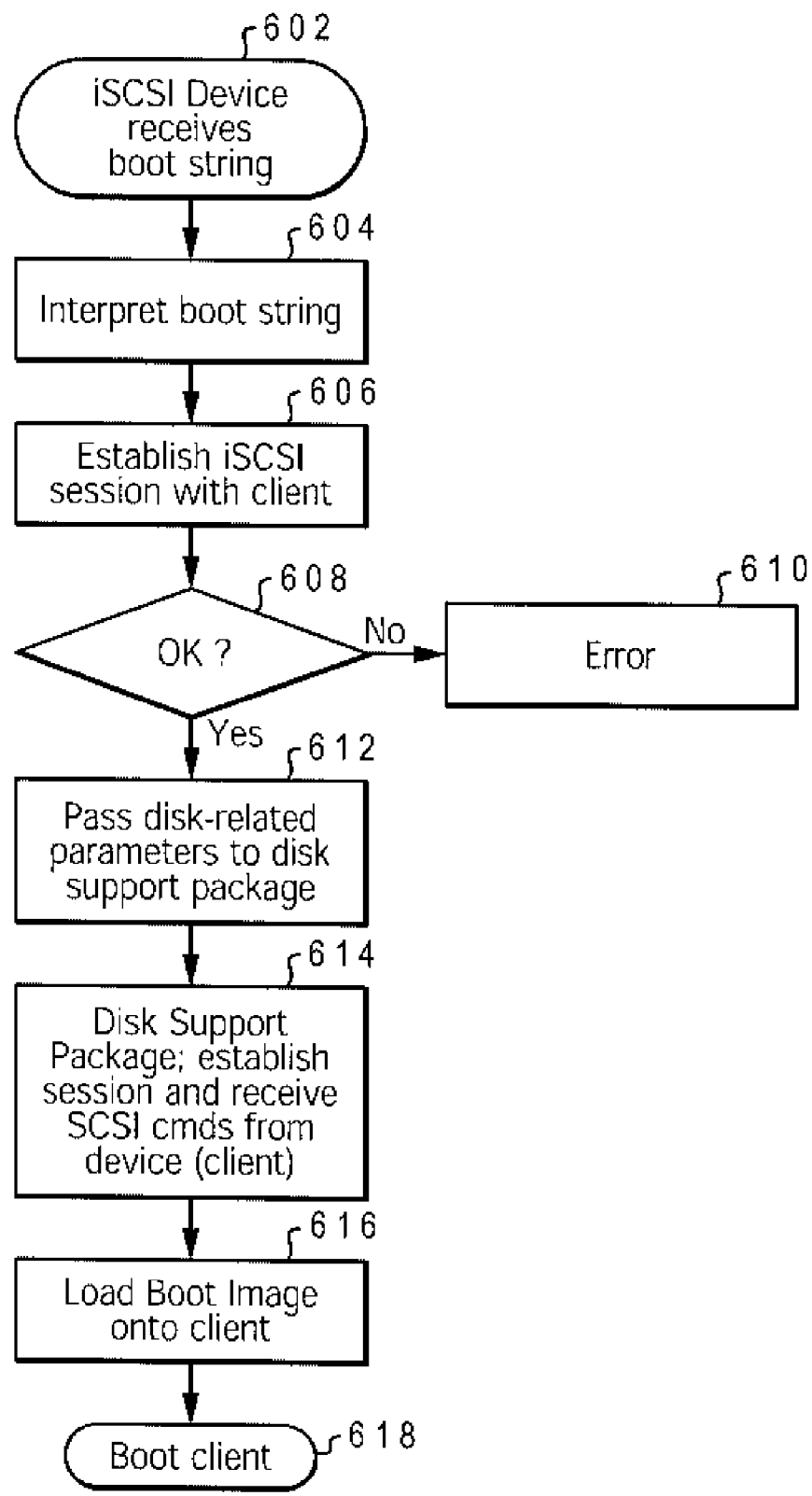
FIG. 6 is a flow chart illustrating the process of establishing an iSCSI session with the remote SCSI device to obtain the boot image from the SCSI disk and complete the OS boot of the client device, according to one embodiment of the invention.

FIG. 6 is a flow chart illustrating the processing that occurs at the iSCSI device (target) during OS boot. At block 602, the iSCSI device receives the boot string created by the network support package. The iSCSI interprets/parses the boot string at block 604, and establishes an iSCSI login session with the client device (computer system 100), at block 606. The iSCSI device checks at block 608 whether the login session is functioning according to pre-established operating standards. If not, the iSCSI device generates an error, and the boot process terminates at block 610. However, assuming the iSCSI session is established and functioning correctly, the iSCSI device passes the disk-related parameters found in the boot arguments to the disk support package, as shown at block 612. The client device transmits SCSI commands over the network to get the boot file from the disk attached to the target SCSI controller. The SCSI commands are received by disk support package at block 614, and disk support package completes the actual loading of the boot image from the remote SCSI disk onto the client device, as shown at block 616. Then the OS boot process of the client device completes (i.e., the OS executes on the client device) as shown at block 618.

The following examples illustrate two different OS boot processes that are identified by the specific keywords and arguments provided within the iSCSI bootstrap method. In the first process, a general network device is identified within the hierarchical structure by firmware (Ex. 1), while in the second process, an iSCSI device is identified (Ex. 2 and 3). Both processes then utilize different sets of arguments. Network-related parameters processed by the device are shown preceding the iSCSI-related parameters. Disk-related parameters are shown following the iSCSI-related parameters.

EXAMPLE 1

With the present example, a BOOTP server is utilized to acquire siaddr, iport, and iname. Other arguments that are not specified assume default values. Also, ciaddr is expressed in IPv6 format. [The process for utilizing IPv6 with iSCSI protocol is described in greater details within the commonly assigned and co-pending application AUS920060583US1, relevant content of which is incorporated herein by reference]
    open network-device: promiscuous, speed=100, duplex=full, iscsi, ipv6, bootp, itname=init-name, ciaddr=init-addr, 2

EXAMPLE 2

With the current example, an SLP server provides the siaddr and iport for the specified iname. Again, other arguments not specified assume default values, and ciaddr is expressed in IPv6 format.
    open iscsi-device: speed=100, duplex=full, iscsi, ipv6, sip, iname=target-name , ciadd=init-addr, 2

EXAMPLE 3

With this third example, the diaddr DHCP server provides siaddr, ciaddr, ilun, iport, and iname, and diaddr is expressed in IPv6 format.
    open iscsi-device: duplex=full, iscsi, ipv6, dhcp=diaddr, chapid=target-chapid, chappw=target-chappw, 2

The above description of the invention involves the use of specific terms/terminology, some of which are defined by the IETF standards board. Where other names are utilized to describe similar functions and/or functionality, it is understood that the invention extends in scope to cover all general functions and/or features regardless of nomenclature utilized. It is also understood that the use of specific parameter names are for example only and not meant to imply any limitations on the invention. The invention may thus be implemented with different nomenclature/terminology utilized to describe the above parameters, without limitation.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A device comprising:
    a processor;
    a memory having thereon programmable code for completing the functionality of an extended network support package, including:
        receiving from a system firmware of a client system a set of boot arguments;
        determining whether the set of boot arguments contains therein a command keyword;
        when the command keyword is not present, initiating a standard TFTP bootstrap process; and
        when a command keyword is present in the set of boot arguments:
            automatically activating an Internet Small Computer Systems Interface (iSCSI) device discovery process wherein an iSCSI device is accessed to retrieve a boot file for the client system; and
            when one or more qualifier keywords are within the set of boot arguments, said automatically activating comprises:
            initiating one or more specific discovery processes corresponding respectively to the one or more qualifier keywords, wherein the one or more discovery processes accesses a specific information server to retrieve addressing parameters and other access information for the iSCSI device; and
            on receipt of the addressing parameters and other access information from the specific information server, forwarding the addressing parameters and other access information to a disk support package of the iSCSI device to trigger loading of the boot file from the iSCSI device to the client system.

2. The device of claim 1, wherein the determining further comprises:
determining whether the set of boot arguments contains one or more qualifier keywords.

3. The device of claim 1, wherein said initiating specific discovery processes initiates a plurality of discovery processes associated with the one or more qualifier keywords contained within the set of boot arguments, wherein the plurality of discovery processes returns specific ones of the addressing parameters and other access information, which specific parameters are combined to provide a complete set of the addressing parameters and other access information required;
wherein return of the boot file to the requesting client system is completed by the disk support package of the iSCSI device on receipt of the complete set of the addressing parameters and other access information.

4. The device of claim 3, wherein when multiple of a same parameter is retrieved from different information servers, said network support package completes the functionality of selecting a value of the parameter retrieved from a last queried server to utilize within the complete set.

5. The device of claim 3, wherein the command keyword is iscsi and the one more qualifier keywords includes dhcp, such that the iSCSI device's addressing parameters is retrieved from a dynamic host configuration protocol (DHCP) server.

6. The device of claim 1, further comprising:
including a first argument and a second argument within the set of extended boot arguments generated by the firmware, wherein the first argument is the command keyword, which distinguishes between different types of bootstrap methods and the second argument is the one or more qualifier keyword, which specifies the discovery protocols to utilize to obtain additional address parameters required for accessing the iSCSI device and loading the boot image from the iSCSI device; and
receiving network specific boot parameters within the boot arguments indicating that the iSCSI device is represented as a network-like device type within a hierarchical data structure generated by the client system's firmware, wherein the network support package processes the network specific boot parameters and obtains additional address parameters and access information of the iSCSI device via a discovery process to enable (a) establishing an iSCSI session via a software iSCSI initiator, when an iSCSI Transmission Control Protocol (TCP) Offload Engine (TOE) hardware is not present and (b) retrieving the boot image from the iSCSI device via the iSCSI session.

7. In a Transmission Control Protocol/Internet Protocol (TCP/IP) computer network environment, having a client system, an Internet Small Computer Systems Interface (iSCSI) device, and one or more information servers, a method comprising:
during an initial boot process by firmware of the client system, representing the iSCSI device within a hierarchical data structure of the client system's hardware configuration;
generating a set of extended boot arguments for transmission to a network support package, wherein the extended boot arguments include a command keyword that identifies to the network support package that an iSCSI discovery process for retrieving a boot image from the iSCSI device is required;
adding within the extended boot arguments one or more qualifier keywords, which identifies to the network support package a specific discovery protocol to implement to retrieve the iSCSI device's address parameters and other access information from the one or more information servers; and
forwarding the set of extended boot arguments to the network support package to trigger the network support package to implement the iSCSI discovery process.

8. The method of claim 7, wherein further said one or more qualifier keywords further identifies to the network support package which one of the one or more information servers to access for retrieval of the address parameters and other information required to access the iSCSI device and load the boot image from the iSCSI device.

9. The method of claim 7, wherein one of said one or more qualifier keywords identifies a specific discovery protocol and additional boot arguments required to utilize that specific discovery protocol.

10. The method of claim 7, wherein when multiple qualifier keywords are provided within the set of extended boot arguments, the multiple qualifier keywords identify respective discovery protocols and associated information servers, such that the network support package may complete a plurality of discovery processes that collectively retrieves the address parameters and other access information required for accessing the iSCSI device and loading the boot image.

11. The method of claim 7, wherein said command keyword and said one or more qualifier keywords are included within the set of extended boot arguments.

12. The method of claim 7, wherein said command keyword is one command keyword among multiple available command keywords that are mutually exclusive, such that only one command keyword may be provided within the set of extended boot arguments.

13. The method of claim 7, wherein:
said command keyword is provided for both iSCSI devices and for network devices, such that the command keyword triggers use of an iSCSI initiator to establish an iSCSI session when no iSCSI Transmission Control Protocol (TCP offload engine (TOE) hardware exists within the client system; and
when the iSCSI device is characterized in the hierarchical data structure as a network-like device type, said method further comprises:
providing network specific boot parameters to the network support package, wherein the network support package processes the network specific boot parameters and obtains additional address parameters and access information of the iSCSI device via a discovery process to enable retrieval of a boot image from the iSCSI device; and
establishing an iSCSI session by providing the iSCSI initiator, when an iSCSI TOE hardware is not present.

14. The method of claim 7, further comprising:
including a first argument and a second argument within the set of extended boot arguments generated by the firmware;
wherein the first argument includes the command keyword, which corresponds to a specific bootstrap method and associated boot arguments and distinguishes between different types of available bootstrap methods;
wherein the second argument includes the one or more qualifier keywords, which specifies the discovery protocols to utilize to obtain additional address parameters required for accessing the iSCSI device and loading a boot image from the iSCSI device; and enabling a mechanism within the network support package that distinguishes between different types of bootstrap methods, including TFTP bootstrap and iSCSI bootstrap, based on a presence of the command keyword within the set of boot arguments;

wherein the TFTP bootstrap is a default method, such that absence of the command keyword within the set of extended boot arguments triggers the TFTP bootstrap method.

15. A system comprising:

a client device having firmware which initiates a boot process of the client device by generating a hierarchical data structure, which includes a representation of an Internet Small Computer Systems Interface (iSCSI) device;

means for generating, via said firmware, a set of extended boot arguments for transmission to a network support package and for retrieving a boot file from an iSCSI device, wherein said extended boot arguments include a command keyword that identifies to the network support package that an iSCSI discovery process for retrieving a boot image from the iSCSI device is required;

means for adding within the extended boot arguments one or more qualifier keywords, which identify to the network support package a specific discovery protocol to implement to retrieve the iSCSI device's address parameters and other access information from the one or more information servers;

means for forwarding the set of extended boot arguments to the network support package to trigger the network support package to implement the iSCSI discovery process;

a network support package configured to receive and process the extended boot arguments including the command keyword and the one or more qualifier keywords in order to obtain the address parameters and other access information from a specific information server whose discovery protocol is identified by the qualifier keyword within the extended boot arguments; and means for retrieving the boot file from the iSCSI device and forwarding the boot file to the client device for completion of the boot process.

16. The system of claim 15, wherein the network is a Transmission Control Protocol/Internet Protocol (TCP/IP) computer network, having (a) the client device, (b) the iSCSI device having thereon the boot file for completing the boot up of the client device and located across a physical network and (c) one or more information servers accessible via a corresponding discovery protocol and which provides addressing information to enable location of and access to the iSCSI device, said system comprising means for:

during an initial boot process by firmware of the client system, representing the iSCSI device within a hierarchical data structure of the client system's hardware configuration.

17. The system of claim 15, wherein further:

said command keyword and said one or more qualifier keywords are within the set of extended boot arguments;

said command keyword is one command keyword among multiple available command keywords that are mutually exclusive, such that only one command keyword may be provided within the set of extended boot arguments;

said one or more qualifier keywords further identifies to the network support package which one of the one or more information servers to access for retrieval of the address parameters and other information required to access the iSCSI device and load a boot image from the iSCSI device;

at least one qualifier keyword identifies a specific discovery protocol and additional boot arguments required to utilize that specific discovery protocol; and when multiple qualifier keywords are provided within the set of extended boot arguments, the multiple qualifier keywords identify respective discovery protocols and associated information servers, such that the network support package may complete a plurality of discovery processes that collectively retrieves the address parameters and other access information required for accessing the iSCSI device and loading the boot image.

18. The system of claim 15, wherein further:

said command keyword is provided for both iSCSI devices and for network devices, such that the command keyword triggers use of an iSCSI initiator to establish an iSCSI session when no iSCSI Transmission Control Protocol (TCP offload engine (TOE) hardware exists within the client system; and when the iSCSI device is characterized in the hierarchical data structure as a network-like device type, said system further comprises means for:

providing network specific boot parameters to the network support package, wherein the network support package processes the network specific boot parameters and obtains additional address parameters and access information of the iSCSI device via a discovery process to enable retrieval of the boot image from the iSCSI device; and establishing an iSCSI session by providing the iSCSI initiator, when an iSCSI TOE hardware is not present.

19. The system of claim 15, further comprising means for:

extending a network support package to accommodate a first argument and one or more of a second argument within the set of extended boot arguments generated by the firmware;

wherein the first argument is the command keyword, which corresponds to a specific bootstrap method and associated boot arguments and distinguishes between different types of available bootstrap methods;

wherein the one or more of the second argument is the one or more qualifier keywords, which specifies the discovery protocols to utilize to obtain additional address parameters required for accessing the iSCSI device and loading the boot image from the iSCSI device; and enabling a mechanism within the network support package to distinguish between different types of bootstrap methods, from among TFTP bootstrap and iSCSI bootstrap, based on a presence of the command keyword within the set of boot arguments;

wherein the TFTP bootstrap is a default method, such that absence of the command keyword within the set of extended boot arguments triggers the TFTP bootstrap method.

* * * * *